United States Patent [19]

Sweeney et al.

[11] Patent Number: 5,709,264
[45] Date of Patent: Jan. 20, 1998

[54] HEAT EXCHANGER

[75] Inventors: Paul Alfred Sweeney, Basking Ridge; Venkat Natarajan, Scotch Plains, both of N.J.

[73] Assignee: The BOC Group, Inc., New Providence, N.J.

[21] Appl. No.: 617,460

[22] Filed: Mar. 18, 1996

[51] Int. Cl.$^6$ ............................. F28D 5/02; F28F 3/00
[52] U.S. Cl. .................... 165/115; 165/146; 165/166; 62/903
[58] Field of Search .................. 165/115, 166, 165/174, 146; 159/13.1, 13.2, 13.3, 28.6; 62/903

[56] References Cited

U.S. PATENT DOCUMENTS

| | | | |
|---|---|---|---|
| 3,992,168 | 11/1976 | Toyama et al. | 165/166 X |
| 4,049,051 | 9/1977 | Parker | 165/166 |
| 4,249,595 | 2/1981 | Butt | 165/166 X |
| 4,450,903 | 5/1984 | Butt | 165/166 X |
| 4,599,097 | 7/1986 | Petit et al. | 165/166 |
| 4,623,019 | 11/1986 | Wiard | 165/146 |
| 4,646,822 | 3/1987 | Voggenreiter et al. | 165/166 |
| 5,321,954 | 6/1994 | Lehman et al. | 165/166 X |

*Primary Examiner*—Leonard R. Leo
*Attorney, Agent, or Firm*—David M. Rosenblum; Salvatore P. Pace

[57] ABSTRACT

A heat exchanger for exchanging heat between first and second fluids. A plurality of vertically oriented passages are defined between alternating first and second passage walls. The first and second passages are provided for bringing the first and second fluids into a heat transfer relationship. To this end, the first passage incorporates an inlet and an outlet, for instance, to admit gaseous nitrogen into the top of the first passages and to discharge condensed nitrogen from the bottom of the first passages. An inlet is provided to introduce the second fluid into the second passages. The second fluid, which is a liquid is to be at least in part vaporized within the second passages. Liquid film, composed of the liquid, is distributed within the second passages by way of an arrangement of slotted dividing bars having staggered slots along the length of such slotted dividing bars to urge liquid against the passage walls defining the passages. Additionally, or in place of the dividing bar arrangement, a multi-domain corrugated fin material arrangement can be provided to effect a liquid film distribution within the second passages.

12 Claims, 3 Drawing Sheets

HEAT EXCHANGER

BACKGROUND OF THE INVENTION

The present invention relates to a heat exchanger of the type known as a downflow reboiler or a failing film evaporator in which heat exchange takes place between two fluids flowing within adjacent, alternating heat exchange passages. Even more particularly, the present invention relates to such a heat exchanger in which one of the two fluids is a liquid that is distributed within heat exchange passages, as a liquid film, by a slotted dividing bar arrangement. Still even more particularly, the present invention relates to such a heat exchanger in which the liquid film is distributed within the heat exchange passages by an arrangement of corrugated fin material having an ever increasing density. Even more particularly, the present invention relates to such a heat exchanger in which liquid film distribution is first accomplished by the dividing bar arrangement and then by the arrangement of corrugated fin material.

Downflow reboilers, also known as falling film evaporators, are used as a vehicle for indirectly transferring heat between two fluids, generally a liquid and a vapor. Such heat exchangers are often constructed from a plurality of parallel plates to form alternating heat exchange passages to indirectly exchange heat between the two fluids. In case of heat transfer to a liquid, heat transfer efficiency is realized by producing a descending liquid film within the heat exchange passages provided for the liquid. In order to further increase efficiency, the heat exchange passages can be filled with sheets of corrugated fin material to form vertically oriented channels within the heat transfer passages. Such channels increase the surface for the flow of the liquid film and therefore, the active area through which heat exchange can take place.

Obviously, to the extent liquid simply falls through the heat exchange passages without ever having formed a film, heat exchange efficiency will be lost. Additionally, the full potential of heat exchange efficiency of such a heat exchanger will not be realized to the extent a liquid film does not form within the channels provided by the corrugated fin material.

As will be discussed, the present invention provide liquid film distribution apparatus to enhance the formation and maintenance of liquid film within heat exchange passages and channels formed by corrugated fin material located within heat exchange passages.

SUMMARY OF THE INVENTION

In one aspect, the present invention provides a heat exchanger for indirectly exchanging heat between first and second fluids. The heat exchanger comprises a plurality of vertically oriented, spaced apart passage walls defining a plurality of alternating first and second passages located between the passage walls to respectively receive the first and second fluids in an indirect heat transfer relationship. First inlet and outlet means are provided for respectively introducing and discharging the first fluid into and from the first passages. Second inlet means are provided for introducing the second fluid into the second passages as a liquid. Slotted dividing bars are located between the passage walls defining the second passages. The slotted dividing bars have spaced, vertically oriented slots to cause the liquid to flow against the passage walls defining the second passages, thereby to enhance formation of liquid film on the passage walls. A second outlet means is provided for discharging the second fluid from the second passages after having indirectly exchanged heat with the first fluid.

In another aspect, the present invention provides a heat exchanger for exchanging heat between first and second fluids. The heat exchanger has a plurality of vertically oriented, spaced apart passage walls defining a plurality of alternating first and second passages located between the passage walls to respectfully receive the first and second fluids in an indirect heat transfer relationship. First corrugated fin material is located within the first and second passages to form vertically oriented channels for downflow of liquid film. First inlet and outlet means are provided for introducing and discharging the first fluid into and from the first passages. A second inlet means is provided for introducing the second fluid into the second passages as a liquid. At least two sections, located above said vertically oriented channels and within said second passages, respectively contain second and third corrugated fin material. The second corrugated fin material is located above said third corrugated fin material. The third corrugated fin material has a corrugation density higher than that of the second corrugated fin material and no less than that of said first corrugated fin material to distribute the liquid film into the vertically oriented channels located within said second passages. A second outlet means is provided for discharging the second fluid from the second passages after having indirectly exchanged heat with the first fluid.

As will be discussed the present invention also comprehends using both of the foregoing aspects in conjunction with one another so that liquid film formation and the distribution of the liquid film is enhanced. It is to be noted that the term "density" as used herein and in the claims means the number of folds or corrugations within the corrugated fin material per unit length of material.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
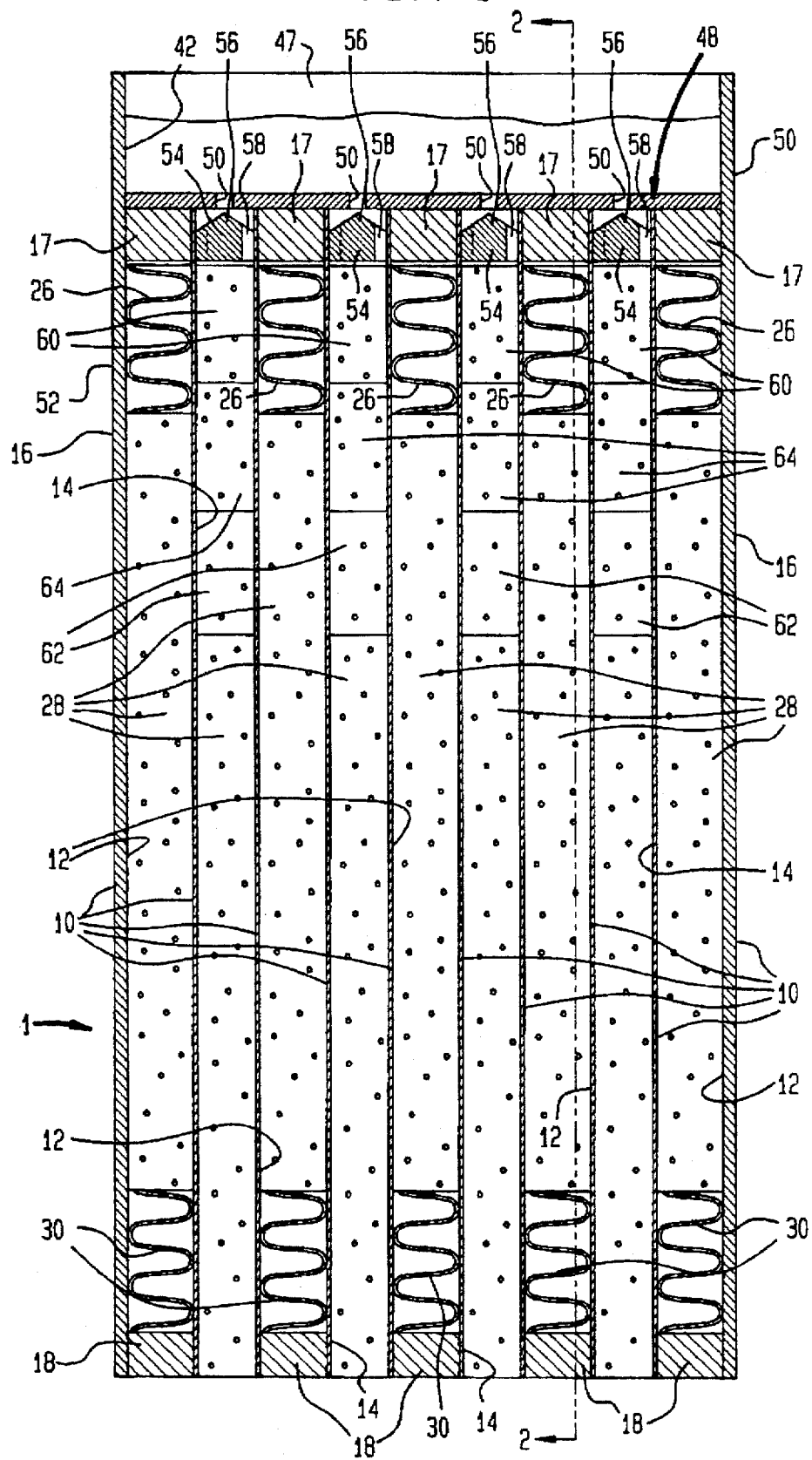
FIG. 1 is a sectional view of a heat exchanger in accordance with the present invention taken along line 1—1 of FIG. 2.
Figure 2:
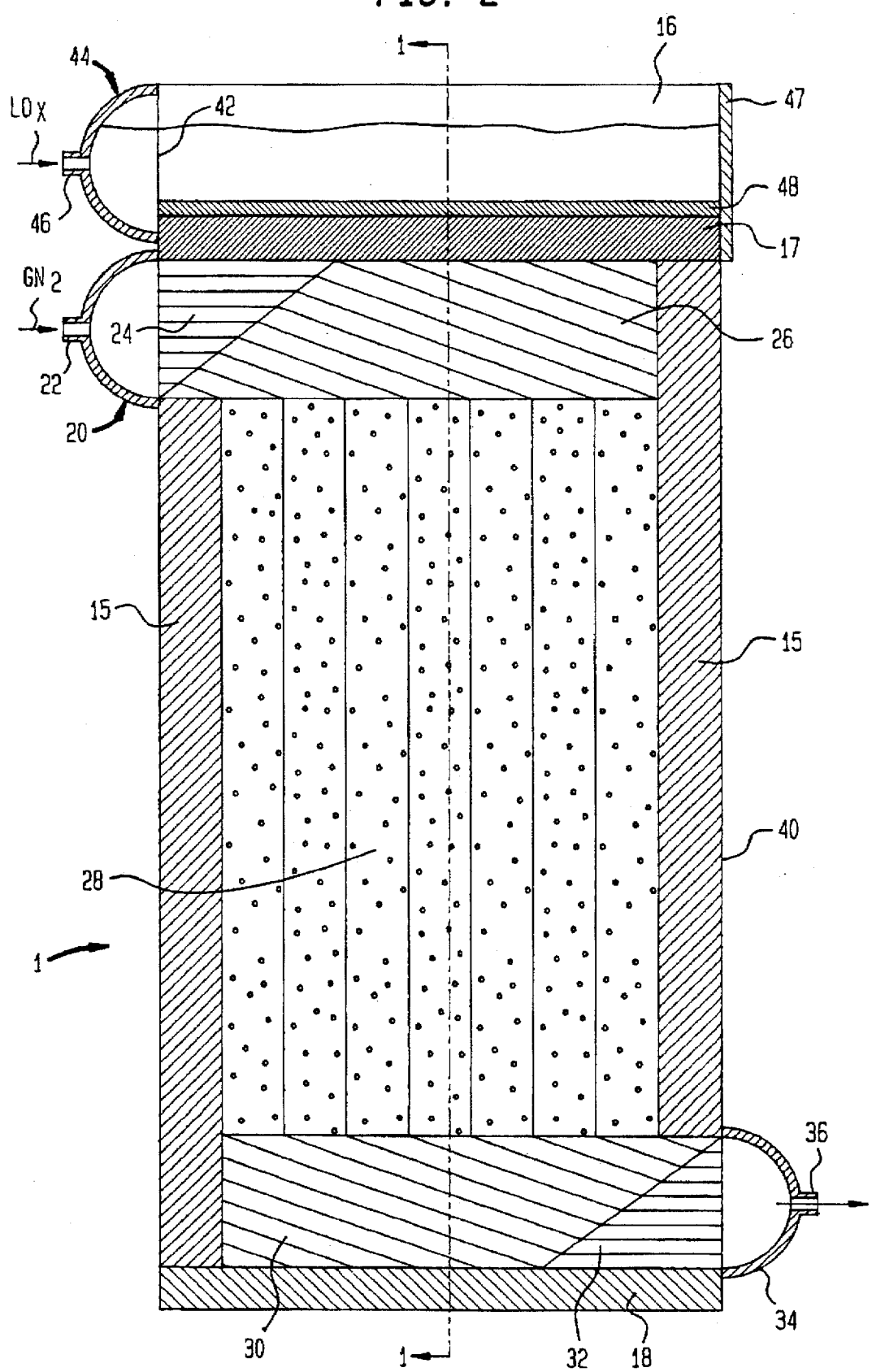
FIG. 2 is a sectional view of FIG. 1 taken along line 2—2 of FIG. 1.

With reference to FIGS. 1 and 2, a heat exchanger 1 in accordance with the present invention is illustrated. Heat exchanger 1 is designed to be used in connection with a sump. The sump can simply be a tank enclosing heat exchanger 1 or a sump, for instance, in a lower pressure column of a double distillation column, designed to receive liquid oxygen.

Heat exchanger 1 is configured to exchange heat between first and second fluids which can be gaseous nitrogen and liquid oxygen. To this end, the plurality of vertically oriented, spaced apart passage walls 10 are provided to define a plurality of alternating first and second passages 12 and 14, respectfully. Passage walls 10 are sandwiched between vertically oriented dividing bars 15, thereby to seal first and second passages 12 and 14 at their lateral edges.

The sides of heat exchanger 1 are formed by sidewalls 16 which are joined at their lateral edges to vertical dividing bars sealing the outermost of first passages 12.

First passages 12 are sealed at the top and bottom by top and bottom dividing bars 17 and 18, respectively located at the top and bottom first passages 12. A first fluid, for instance, gaseous nitrogen to be condensed, enters a first inlet manifold 20 having an inlet opening 22. For exemplary purposes, the gaseous nitrogen having entered inlet manifold 20 is then conducted in a horizontal direction by horizontally oriented, corrugated fin material 24. Inclined corrugated fin material 26 conducts the horizontal flow of nitrogen to a more vertical direction for reception in first passages 12. In order to increase surface area for heat transfer, each of the first and second passages contain a first corrugated fin material 28. After liquefaction within first passages 12, the resulting liquid is deflected to the horizontal from the vertical by provision of inclined corrugated fin material 30 and horizontally oriented corrugated fin material 32. Liquid nitrogen is then discharged from first passages 12 by provision of a first outlet manifold 34 having a discharge opening 36.

First inlet manifold 20 and first outlet manifold 34 are connected to vertically oriented dividing bars 15. As illustrated, the vertically oriented dividing bars 15 used in sealing first passages 12 are staggered to allow the first fluid to enter first passages from first inlet manifold 20 and thereafter, to be discharged from first passages 12 to first outlet manifold 34.

A second fluid (that for purposes of illustration can be liquid oxygen) enters a reservoir 42 through a second inlet manifold 44 having an inlet opening 46. Reservoir 42 is formed, on one side, by second inlet manifold 44 and, on the opposite side by an end plate 47. Sidewalls 16 are sized to extend above first and second passages 12 and 14 to form the transverse sides of reservoir 42. Liquid flows through a perforated base plate 48 having openings 50 to second passages 14 where the liquid descends as a film and undergoes indirect heat exchange with the first fluid passing within first passages 12. As illustrated, second passages 14 are open at the bottom of heat exchanger 1 to allow liquid that has not been vaporized to fall into the sump to be used in connection with the illustrated embodiment of heat exchanger 1. Thus, although not illustrated, dividing bars 15 used in connection with second passages 14 extend the full length of second passages 14. As could be appreciated to those skilled in the art, an outlet manifold or the like could be provided to conduct liquid from heat exchanger 1 if heat exchanger 1 were not used with a sump.

Figure 3:
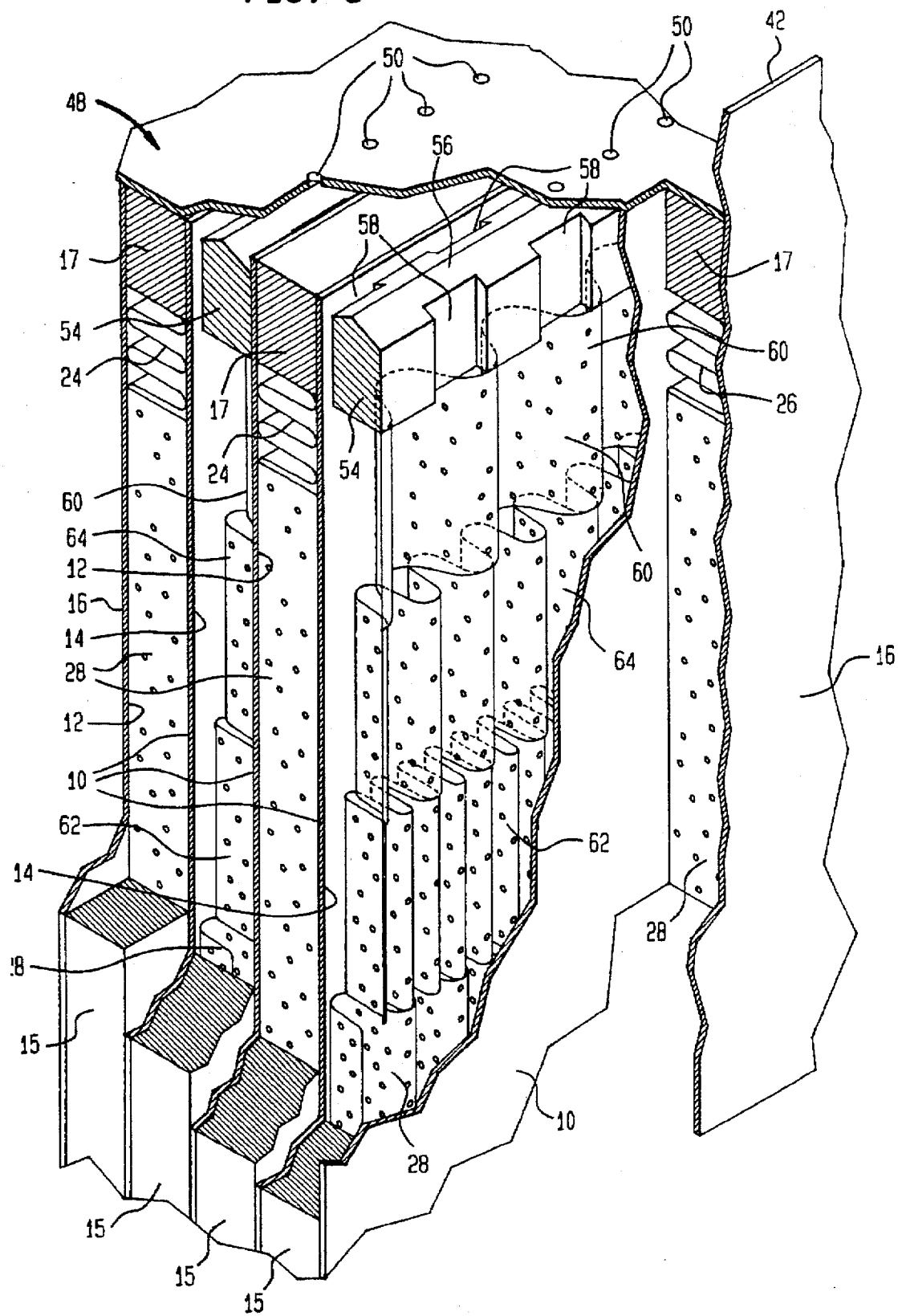
FIG. 3 is a fragmentary, perspective view of a heat exchanger in accordance with the present invention with portions broken away in order to show internal components of such heat exchanger.

With additional reference to FIG. 3, liquid passing through openings 50 falls onto slotted dividing bars 54, each of which may have a lengthwise extending peak 56. An alternate arrangement of staggered slots 58 defined within the sides of each of dividing bar 54 allow liquid to flow downwardly and against passage walls 10 to initiate liquid film production. It is understood that peaks 56 could be deleted and as such, the top of slotted dividing bars 54 could be flat. In any embodiment of dividing bars 54, the staggering of slots 58 ensures that liquid coverage will be along the entire length of each of second passages 14 so as to fully utilize second passages 14.

As mentioned above, first corrugated fin material 28 is provided in both first and second passages 12 and 14. The corrugations of first corrugated fin material 28 produce vertical channels within each of first and second passages 12 and 14. In order to produce film formation on as many of such vertical channels as possible, second, third, and fourth corrugated fin materials 60, 62 and 64 can be provided to further distribute liquid film initiated at slotted dividing bars 54. Second corrugated fin materials 60 is less dense than underlying third corrugated fin material 62. Fourth corrugated fin material 64, interposed between second and third corrugated fin materials 60 and 62 has a greater corrugation density than second corrugated fin material 60 but less dense than third corrugated fin material 62. This arrangement of corrugated fin materials insures that descending liquid film becomes increasingly more divided during its descent through these sections of corrugated fin materials. In order to properly distribute liquid film to, the vertical channels formed by first corrugated film material 28, the corrugation density of third corrugated fin material 62 should be no less than first corrugated fin material 28.

This multi-domain tinning (described above) could be constructed from two regions of corrugated-fin material, the first region having a lower density of material than an underlying second region. Moreover, as mentioned above, such multi-domain distribution could be utilized alone or in conjunction with liquid film distribution designs other than slotted dividing bars 54.

While the present invention has been described with reference to a preferred embodiment, as will occur to those skilled in the art, numerous additions, changes and omissions may be made without departing from the spirit and scope of the present invention.

We claim:

1. A heat exchanger for exchanging heat between first and second fluids, said heat exchanger comprising:

a plurality of vertically oriented, spaced apart passage walls defining a plurality of alternating first and second passages located between said passage walls to respectively receive said first and second fluids in an indirect heat transfer relationship;

first inlet and outlet means for respectively introducing and discharging said first fluid into and from said first passages;

second inlet means for introducing said second fluid into said second passages as a liquid;

slotted dividing bars located between said passage walls defining said second passages, said slotted dividing bars having spaced, vertically oriented slots to cause said liquid to flow against said passage walls defining said second passages, thereby to enhance formation of liquid film on said passage walls; and each of the slotted dividing bars having a lengthwise extending peak to cause the liquid to flow towards the slots and second outlet means for discharging said second fluid from said second passages after having indirectly exchanged heat with said first fluid.

2. The heat exchanger of claim 1, further comprising:

first corrugated fin material located within the first and second passages for forming vertically oriented channels for downflow of the liquid film at least two sections, located between said vertically oriented channels and said slotted dividing bars and within said second passages, respectively containing second and third corrugated fin material;

said second corrugated fin material being located above said third corrugated fin material; and said third corrugated fin material having a higher corrugation density than said second corrugated fin material and no less than said first corrugated fin material to distribute said liquid film into said vertically oriented channels located within said second passages.

3. The heat exchanger of claim 1, wherein said slots on each side of said slotted dividing bars are spaced apart from one another so that said slots alternate.

4. The heat exchanger of claim 3, wherein said outlet means comprise said second passages being open at a bottom region of said heat exchanger.

5. The heat exchanger of claim 4, wherein each of said first inlet and outlet means comprises a manifold to distribute said first fluid to said first passages, corrugated fin material to horizontally conduct said first fluid, and inclined corrugated fin material to help deflect said first fluid from horizontal flow to vertical flow.

6. The heat exchanger of claim 5, wherein said passage walls comprise a plurality of spaced apart plates.

7. The heat exchanger of claim 1, further comprising a fourth corrugated fin material located between said second and third corrugated fin materials and having an intermediate density between corrugation densities of said second and third corrugated fin materials.

8. A heat exchanger for exchanging heat between first and second fluids, said heat exchanger comprising:

a plurality of vertically oriented, spaced apart passage walls defining a plurality of alternating first and second passages located between said passage walls to respectively receive said first and second fluids in an indirect heat transfer relationship;

first corrugated fin material located within the first and second passages for forming vertically oriented channels for downflow of liquid film;

first inlet and outlet means for respectively introducing and discharging said first fluid into and from said first passages;

second inlet means for introducing said second fluid into said second passages as a liquid;

at least two sections, located above said vertically oriented channels and within said second passages, respectively containing second and third corrugated fin material;

said second corrugated fin material located above said third corrugated fin material;

said third corrugated fin material having a higher corrugation density than that of said second corrugated fin material and no less than that of said first corrugated fin material to distribute said liquid film into said vertically oriented channels located within said second passages; and second outlet means for discharging said second fluid from said second passages after having indirectly exchanged heat with said first fluid.

9. The heat exchanger of claim 8, wherein said outlet means comprise said second passages being open at a bottom region of said heat exchanger.

10. The heat exchanger of claim 9, wherein each of said first inlet and outlet means comprises a manifold to distribute said first fluid to said first passages, horizontally oriented corrugated fin material to horizontally conduct said first fluid, and inclined corrugated fin material to help deflect said first fluid from horizontal flow to vertical flow.

11. The heat exchanger of claim 10, wherein said passage walls comprise a plurality of spaced apart plates.

12. The heat exchanger of claim 8, further comprising a fourth corrugated fin material located between said second and third corrugated fin materials and having an intermediate density between corrugation densities of said second and third corrugated fin materials.

* * * * *